United States Patent
Bruns

[19]

[11] Patent Number: 5,924,270
[45] Date of Patent: *Jul. 20, 1999

[54] SKID SHOE

[75] Inventor: Mark W. Bruns, Gibbon, Minn.

[73] Assignee: May-Wes Manufacturing, Inc., Hutchinson, Minn.

[*] Notice: This patent is subject to a terminal disclaimer.

[21] Appl. No.: 08/912,784

[22] Filed: Aug. 18, 1997

Related U.S. Application Data

[60] Continuation-in-part of application No. 29/060,267, Sep. 25, 1996, Pat. No. Des. 391,582, which is a division of application No. 29/046,505, Nov. 16, 1995, Pat. No. Des. 382, 570.

[51] Int. Cl.⁶ .................................................. A01D 67/00
[52] U.S. Cl. ............................... 56/320.1; 56/119; D15/29
[58] Field of Search ................................. 56/13.6, 17.4, 56/119, DIG. 24, 320.1; D15/28

[56] References Cited

U.S. PATENT DOCUMENTS

| | | | |
|---|---|---|---|
| D. 314,778 | 2/1991 | Rabitsch | D15/28 |
| D. 382,570 | 8/1997 | Bruns | D15/28 |
| D. 391,582 | 3/1998 | Bruns | D15/28 |
| 4,103,476 | 8/1978 | Oosterling et al. | 56/13.6 |
| 4,633,656 | 1/1987 | Willinger | 56/13.6 |
| 4,729,212 | 3/1988 | Rabitsch | 56/119 |
| 5,012,635 | 5/1991 | Walters et al. | 56/13.6 |
| 5,090,184 | 2/1992 | Garter et al. | 56/10.2 |
| 5,174,101 | 12/1992 | Rabitsch | 56/17.4 |

OTHER PUBLICATIONS

Implement & Tractor Mar. 1989 p. 99 "Slippery Shoes".

Farm Industry News Mar. 1985 p. 46, 47 "Poly Skid Shoes".

*Primary Examiner*—Heather Shackelford

[57] ABSTRACT

An agricultural crop combine has a header with skid plates and low friction plastic skid shoes mounted on the skid plates. Each skid shoe has a thickness that progressively and uniformly increases from the front end to the rear end of the shoe. The skid plates are made with a sinter molding process that subjects powder plastic in a mold to heat and pressure to cause the plastic to become a coherent mass comprising the complete skid shoe.

20 Claims, 3 Drawing Sheets

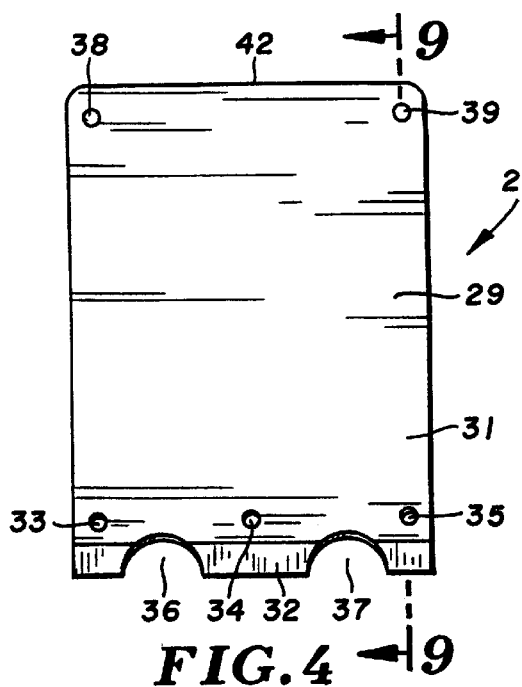
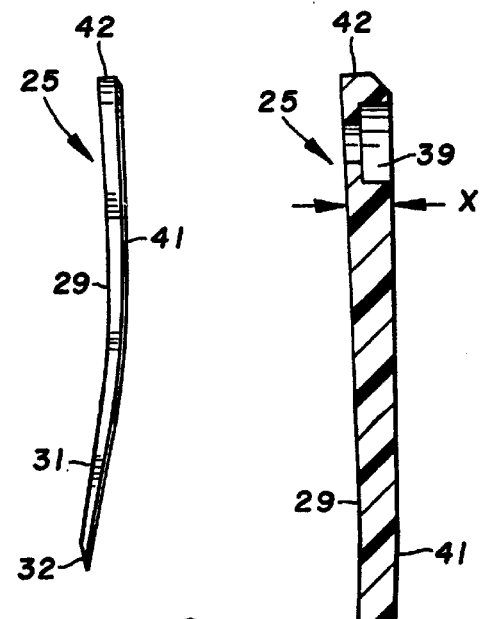
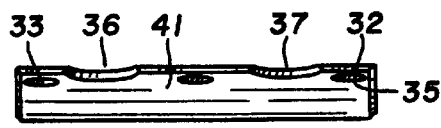
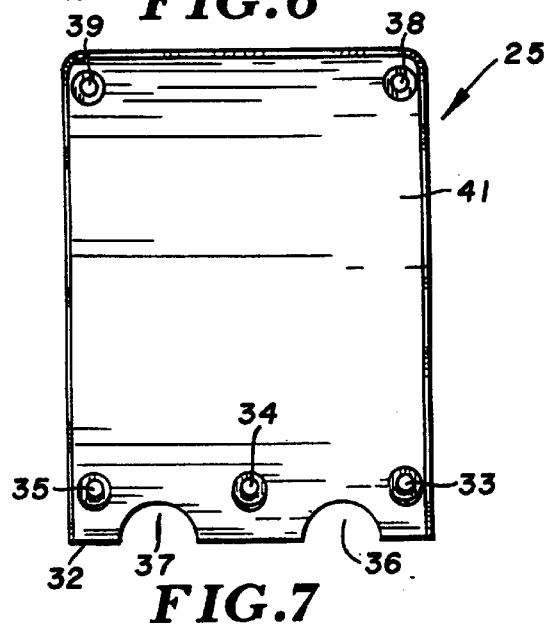
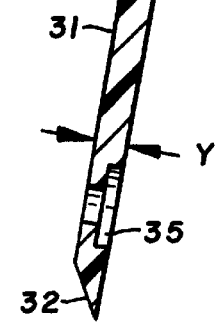

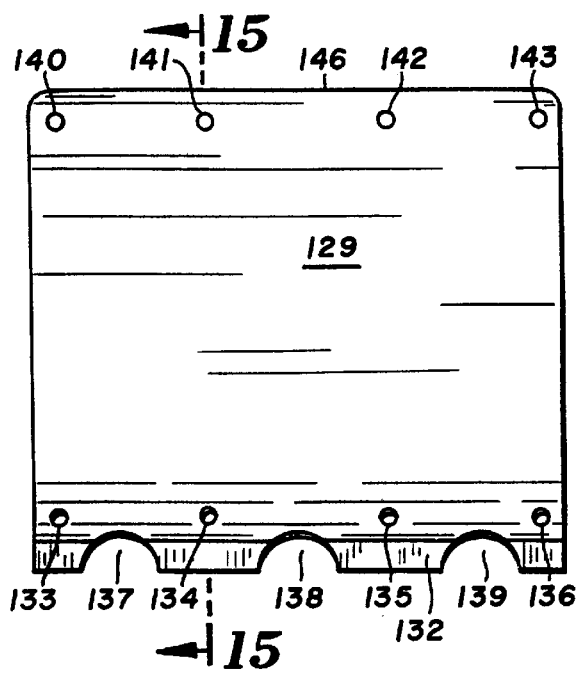
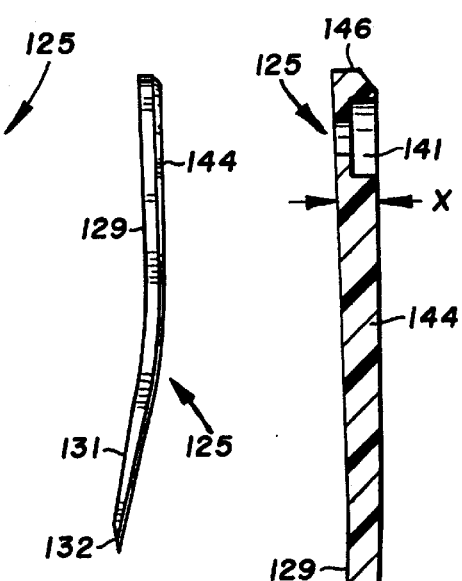
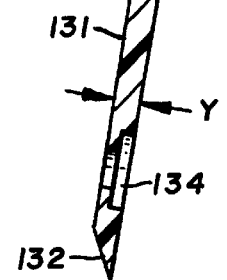
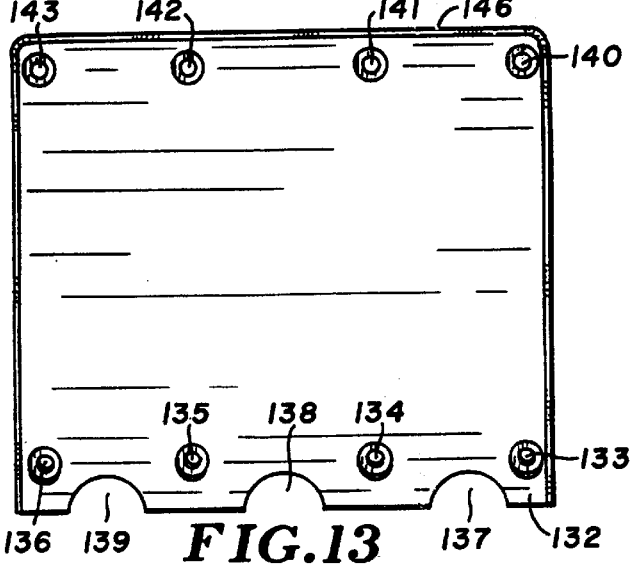

SKID SHOE

CROSS REFERENCE TO RELATED APPLICATION

This application is a continuation-in-part of U.S. application Ser. No. 29/046,505 filed Nov. 16, 1995, now U.S. Pat. No. D382,570 and application Ser. No. 29/060,267 filed Sep. 25, 1996, now U.S. Pat. No. D391,582.

FIELD OF THE INVENTION

The invention is in the art of protective covers for agricultural implements that inhibit adhesion of soil and collection of debris on the covers. Specifically, the protective covers are low friction plastic skid shoes for combine headers that are attached to the conventional combine header skid plates that prevent adhesion of soil and collection of debris on the shoes and damage to the skid plates and header.

BACKGROUND OF THE INVENTION

Self-propelled combines have headers equipped with skid plates located below and rearwardly of the crop cutting knives and guards. The skid plates are metal members which collect soil that can interfere with the crop cutting operation of the header and power required to propel the combine. The skid plates must be cleaned to overcome the adverse operation of the combine. The combine is shut down to allow the operator to remove soil and debris from the skid plates. Plastic covers or panels have been used with the skid plates to prevent adhesion of soil to the plates and panels. T. D. Rabitsch in U.S. Pat. No. 4,729,212 discloses covers for combine skid plates made from ultra high molecular weight polyethylene plastic which has a low coefficient of friction. Soil, such as wet clay, does not adhere to the plastic covers. Each cover has an upper surface that mates with the outer surface of a conventional skid plate and an outer surface substantially parallel to the upper surface. The cover has uniform thickness as it is cold pressed from a sheet of plastic. This cover does not compensate for uneven wear of the cover due to soil and stone abrasion. T. D. Rabitsch in U.S. Pat. No. 5,174,101 discloses plastic covers for combine skid plates that have uniform thickness and transverse live hinges to compensate for varying tolerances of the skid plates to achieve mating engagement between the covers and skid plates. The live hinges have transverse grooves in the outer surfaces of the cover which can collect soil and debris. These plastic covers are stamped or cold pressed from a sheet of plastic having uniform thickness. The stamped covers cannot have increasing thickness along their length to compensate for wear. The plastic has memory characteristics which cause the plastic to return to its original flat shape. The covers have inconsistent shapes which do not allow for mating engagement with the combine skid plates. The skid shoes of the invention are improvements in plastic skid shoes that obviate the problems of the prior covers for combine skid plates.

SUMMARY OF THE INVENTION

The invention comprises a low friction plastic skid shoe for a combine header that is molded into its desired shape which includes variations in thickness to compensate for wear and flexibility. The skid shoe has a thick section in the critical areas of high stress and hardest wear and a thinner section at areas that require flexibility to compensate for tolerances of the combine skid plates. The skid shoes have uniform quality and shapes determined by the mold and sinter process of making the shoes. The prior cold pressing of the skid covers from a sheet of plastic produces excess throw away plastic. The molding of the skid shoes does not produce excess or scrap plastic and is less labor intensive to manufacture than cold pressing.

The preferred embodiments of the skid shoes are a one-piece ultra high molecular weight polyethylene plastic having a thickness that uniformly increases from its front section to the rear section. The rear section has a thickness that is at least twice the thickness of the front section. The thick rear section is a critical area of the shoe as it is subjected to high stress and hard wear as it frequently contacts the soil and stones therein as the combine moves in the field. The front section of the skid shoe has a degree of flexibility to allow it to be retained in surface engagement with the bottom of the combine skid plate. The bottom surface of the shoe has a continuous rear linear section that merges with an upwardly inclined continuous front section. Countersunk holes are in the opposite ends of the shoe to accommodate fasteners that secure the skid shoe to the combine skid plates. The bottom surface does not have any grooves, recesses or live hinges that can collect soil and debris. The front edge is tapered and has cutouts for the bolt and nut fasteners that secure the skid shoes to the header.

The skid shoes are made in a pressure and heat mold having a cavity with the final shape of the shoe plate. The plastic in powder form is placed in the mold and subjected to a sinter process comprising a temperature of 380 degrees F. and high pressure. The powder plastic consolidates into a solid and becomes a coherent mass forming a shoe having the progressively increasing thickness and curved shape. The shoe does not have a memory that tends to change its shape. Each shoe made with the same mold has consistent shape and quality. Excess and throw-away plastic is not present as the shoes removed from the mold are ready for installation on the combine skid plate.

The objects and advantages of the skid shoes of the invention as noted herein are included in the following detailed description and drawings.

DESCRIPTION OF THE DRAWINGS

FIG. 4 is a top plan view of a skid shoe of the invention;

FIG. 5 is a front elevational view of the skid shoe of FIG. 4;

FIG. 6 is a rear elevational view of the skid shoe of FIG. 4;

FIG. 7 is a bottom plan view of the skid shoe of FIG. 4;

FIG. 8 is a side elevational view of the skid shoe of FIG. 4;

FIG. 9 is an enlarged sectional view taken along the line 9—9 of FIG. 4;

FIG. 10 is a top plan view of a modification of the skid shoe of the invention;

FIG. 11 is a front elevational view of the skid shoe of FIG. 10;

FIG. 12 is a rear elevational view of the skid shoe of FIG. 10;

FIG. 13 is a bottom plan view of the skid shoe of FIG. 10;

FIG. 14 is a side elevational view of the skid shoe of FIG. 10; and

FIG. 15 is an enlarged sectional view taken along the line 15—15 of FIG. 10.

DESCRIPTION OF PREFERRED EMBODIMENTS

Figure 1:
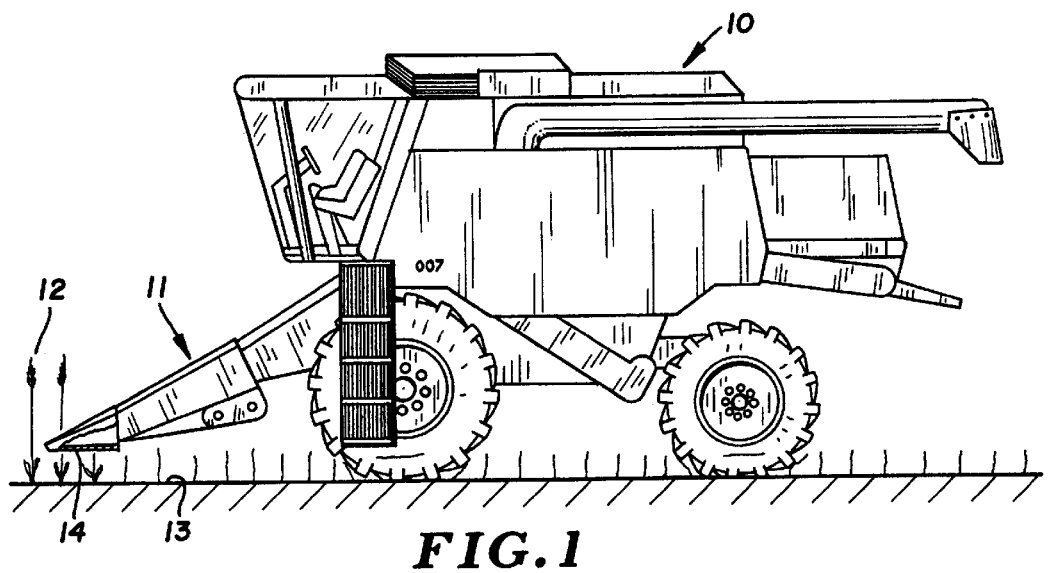
FIG. 1 is a side elevational view of an agricultural combine having a header equipped with the skid shoes of the invention.
Figure 2:
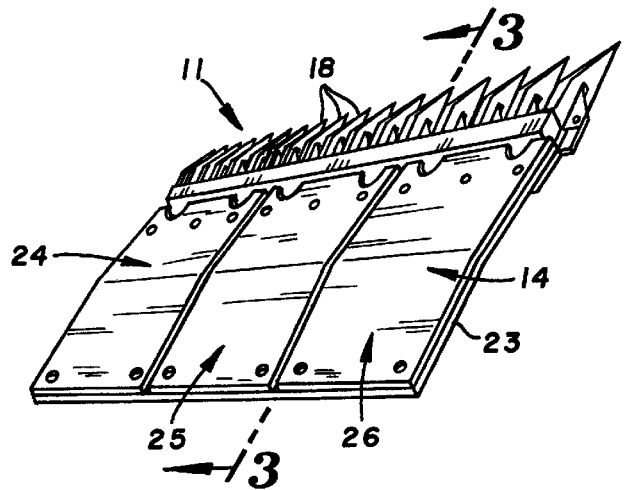
FIG. 2 is a bottom perspective view of the skid shoes mounted on the header.

A conventional agricultural crop harvester 10, shown in FIG. 1, has a header 11 operable to cut crops 12, such as grain, corn, rice and beans, and transport the crop into the harvester. The operator of harvester 10 manipulates harvester controls that selectively moves header 11 up and down and locates the bottom of header 11 close to the surface of ground 13. The header 11 at times rides on the ground due to the contour and irregular surface of the ground. Wet soil and trash build up on the header is minimized with low friction high density plastic shoes 14 mounted on the bottom of header 11.

Figure 3:
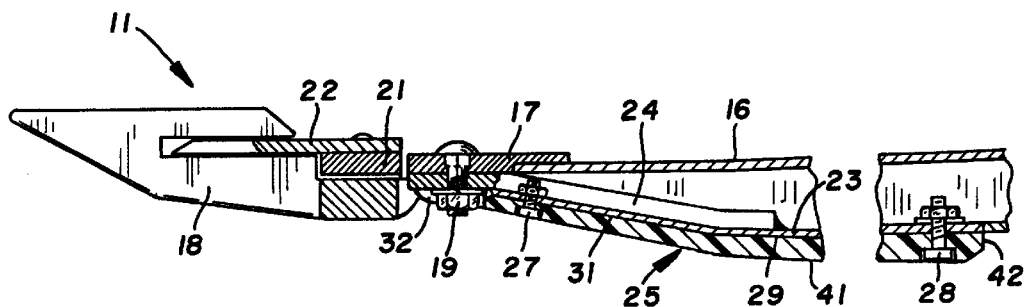
FIG. 3 is an enlarged sectional view taken along the line 3—3 of FIG. 2.

As shown in FIG. 3, header 11 has a platform 16 secured to a transverse plate 17. A plurality of side-by-side guards 18 are attached to plate 17 with bolt and nut fasteners 19. A cutter bar 21 having knife blades 22 is associated with guards 18. Cutter bar 21 is moved relative to guards 18 to cut crop 12 as the harvester moves over the ground.

A metal bottom member 23 located below platform 16 is a conventional ground engaging metal skid shoe which spaces guards 18 above ground 13. A bar 24 secured to member 23 connected to plate 17 with nut and bolt fasteners 19 reinforces the upwardly inclined forward section of bottom member 23. Bottom member 23 is a metal sheet. In use, mud and trash builds up on the member 23. These materials must be removed from member 23 to allow header 11 to be moved close to ground 13.

A plurality of side-by-side plastic skid shoes 24–26 are secured to the bottom of member 23 with nut and bolt fasteners 27 and 28. Shoes 24–26 are identical in structure and material. The following description is directed to shoe 25. FIGS. 4 to 9 show shoe 25 before it is attached to member 23. Shoe 25 is a one-piece molded ultra high molecular weight polyethylene plastic. The plastic has a low coefficient of friction to resist adhesion of soil on the shoe. The plastic shoe is abrasion and impact resistant. The plastic shoe is made with a compression and heat process which ensures consistent production of shoes at a low cost when compared to cutting or machining shoes from plastic stock.

Skid shoe 25 has a continuous top surface 29 having an upwardly curved forward portion 31 extended to a tapered transverse front end or lip 32. Three front countersunk holes 33–35 extend through the front section of shoe 25 to accommodate bolt and nut fasteners 27. A pair of semi-circular cutouts or recesses 36 and 37 in lip 32 provide spaces for bolt and nut fasteners 19. A pair of countersunk holes 38 and 39 located in rear corner sections of shoe 25 accommodate nut and bolt fasteners 28 that attach shoe 25 to bottom member 23.

Shoe 25 has a continuous bottom surface 41 having a flat rear section and an upwardly curved front section extended from front end 32 to transverse rear end 42. The front and back ends 32 and 42 have reduced thickness to allow the top surface 29 of shoe 25 to be pulled tight against bottom member 23. As shown in FIG. 9, shoe progressively increases in thickness from front end 32 to rear end 42. The rear section of shoe 25 has a thickness that is twice the thickness of the front section of the shoe. The thick section of shoe 25 is in the heavy wear areas which extends the useful life of the shoe. The contour of bottom surface 41 of shoe 25 promotes soil flow past the shoe and eliminates soil buildup and friction as the header glides across the field in wet and dry conditions. The continuous and smooth bottom surface 41 of shoe 25 has no grooves and catch spots for collection of debris and soil. Shoe 25 does not have live hinge recesses and grooves or blunt edges that act as shovels which builds up dirt and debris.

A modification of the skid shoe of the invention, as shown in FIGS. 10 to 15, is indicated generally as shoe 125. Shoe 125 has a continuous top surface 129 that includes an upwardly curved forward portion 131. Portion 131 terminates in a tapered transverse front end or lip 132. Four front countersunk holes 133–136 extend through the front section of shoe 125 to accommodate bolt and nut fasteners for attaching shoe 125 to member 23. The front section of shoe 125 has three cutouts or recesses 137, 138 and 139 providing spaces for nut and bolt fasteners for the guards. The rear section of shoe 125 has four countersunk holes 140–143 to accommodate nut and bolt fasteners for attaching shoe 125 to member 23.

Shoe 125 has a continuous bottom surface 144 having a rear flat section and an upwardly curved front section extended to lip 132 and a transverse rear end 146. The lip 132 and back end of shoe 125 have reduced thickness to allow the top surface 129 of the shoe to be pulled tight against member 23 or a similar support. As shown in FIG. 15, shoe 125 progressively increases in thickness from front end 132 to rear end 146. The rear section of shoe 125 has a thickness that is at least twice the thickness of the front section of the shoe. The thick section of shoe 125 is in the heavy wear areas which extends the useful life of the shoe. The contour of the bottom surface 144 of shoe 125 promotes soil flow past the shoe and eliminates soil buildup and friction as the header glides across the field in wet and dry conditions. The continuous and smooth bottom surface 144 of shoe 125 has no grooves and catch spots for collection of debris and soil. Shoe 125 does not have live hinge recesses and grooves or blunt edges that act as shovels which builds up dirt and debris.

Examples of skid shoes 25 and 125 have the following sizes and shapes. Skid shoes 25 is a one-piece ultra high molecular weight polyethylene plastic made by a sinter molding process Shoe 25 has a width of 14.5 cm and a length of 20 cm. The thickness X of the rear section of the shoe is 10 mm and the thickness Y of the front section of shoe 25 is 5 mm. The thickness of shoe 25 progressively increases uniformly from the front section to the rear section of the shoe. The front section of shoe 25 is inclined upwardly from the flat plane of the flat rear section at an angle of about 12 degrees. The front lip 32 has a length of 15 mm. The cutouts 36 and 37 are semi-circular recesses each having a transverse width or diameter of 3 cm.

Skid shoe 125 is a one-piece ultra high molecular weight polyethylene plastic made by a sinter molding process. Shoe 125 has a width of 22.5 cm and a length of 20 cm. The thickness X of the rear section of shoe 125 is 10 mm and the thickness Y of the front section of shoe 125 is 5 mm. The thickness of shoe 125 progressively increases uniformly from the front section to the rear section. The front section of shoe 125 is inclined upwardly from the flat plane of the flat rear section at an angle of about 12 degrees. The front lip 132 has a length of 15 cm and three semi-circular cutouts each having a transverse width or diameter of 3 cm.

Skid shoes 25 and 125 are molded with a sinter process that subjects powder plastic to heat and pressure causing the plastic to become a coherent mass having the shapes of the shoes. The shoes are not cold pressed. Molds having cavities in the size and shape of the shoes are used to heat powder plastic in the cavities and subject the plastic to high pressures which transforms the powder plastic into solid shoes. The size and shape of each shoe made from the mold is consistent and has uniform quality.

While there has been shown and described preferred embodiments of the skid shoes of the invention and process of making the skid shoes, it is understood that changes in the size and shapes of the skid shoes and materials used to make the skid shoes can be made by those skilled in the art without departing from the invention. The invention is defined in the following claims.

I claim:

1. A skid shoe for use on a skid plate of an agricultural crop combine header comprising: a one-piece member of ultra high molecular weight polyethylene plastic having a generally flat rear section and an upwardly inclined front section, said rear section having a thickness of at least twice the thickness of the front section, said member progressively and uniformly increasing in thickness from the front section to the rear section thereof, said member being made by a molding process which subjects powder plastic to heat and pressure to cause the powder plastic to become a coherent mass having the shape of the skid shoe.

2. The skid shoe of claim 1 wherein: the front section of the member has a transverse forwardly tapered front end.

3. The skid shoe of claim 2 wherein: the front end has rearwardly extended recesses.

4. The skid shoe of claim 3 wherein: each of said recesses has semi-circular shape.

5. The skid shoe of claim 1 wherein: said member has a plurality of holes for accommodating fasteners for attaching the skid shoe to a skid plate.

6. The skid shoe of claim 1 wherein: the front section of the member is inclined upwardly at an angle of about 12 degrees relative to the flat plane of the rear section of the member.

7. The skid shoe of claim 1 wherein: the rear section of the member adjacent the rear end thereof has a thickness of at least 10 mm and the front section of the member adjacent the front end thereof has a thickness of about 15 mm.

8. A skid shoe for use on a skid plate of an agricultural crop combine header comprising: a one-piece plastic member having a front section and a rear section, said rear section having a thickness substantially greater than the thickness of the front section, said member increasing in thickness from the front section to the rear section thereof, said member being made by a molding process which subjects powder plastic to heat and pressure to cause the powder plastic to become a coherent mass having the shape of the skid shoe.

9. The skid shoe of claim 8 wherein: the member is ultra high molecular weight polyethylene plastic.

10. The skid shoe of claim 8 wherein: the front section of the member has a transverse forwardly tapered front end.

11. The skid shoe of claim 10 wherein: the front end has rearwardly extended recesses.

12. The skid shoe of claim 11 wherein: each of said recesses has semi-circular shape.

13. The skid shoe of claim 8 wherein: said member has a plurality of holes for accommodating fasteners for attaching the skid shoe to a skid plate.

14. The skid shoe of claim 8 wherein: the front section of the member is inclined upwardly at an angle of about 12 degrees relative to the flat plane of the rear section of the member.

15. The skid shoe of claim 8 wherein: the rear section of the member adjacent the rear end thereof has a thickness of at least 10 mm and the front section of the member adjacent the front end thereof has a thickness of about 15 mm.

16. A skid shoe for use on a skid plate of an agricultural crop combine header comprising: a one-piece member of low friction material having a front section and a rear section, said rear section having a thickness substantially greater than the thickness of the front section, said member increasing in thickness from the front section to the rear section thereof.

17. The skid shoe of claim 16 wherein: the front section of the member has a transverse forwardly tapered front end.

18. The skid shoe of claim 16 wherein: the front section of the member is inclined upwardly at an angle of about 12 degrees relative to the flat plane of the rear section of the member.

19. The skid shoe of claim 18 wherein: the rear section of the member adjacent the rear end thereof has a thickness of at least 10 mm and the front section of the member adjacent the front end thereof has a thickness of about 5 mm.

20. The skid shoe of claim 19 wherein: the member is ultra high molecular weight polyethylene plastic.

* * * * *